UNITED STATES PATENT OFFICE.

ALEXANDER HERZEN, OF FLORENCE, ITALY.

IMPROVEMENT IN COMPOSITIONS FOR PRESERVING MEAT.

Specification forming part of Letters Patent No. 172,878, dated February 1, 1876; application filed January 18, 1875.

*To all whom it may concern:*

Be it known that I, ALEXANDER HERZEN, of Florence, Italy, doctor of medicine, have invented improvements in preserving fresh uncooked meat and other animal food, and antiseptic mixtures for that purpose; and I, ALEXANDER HERZEN, do hereby declare the nature of my invention, and in what manner the same is to be performed, to be particularly described and ascertained in and by the following statement thereof—that is to say:

This invention relates to the preservation of fresh uncooked meat and other animal food, such as fowl, game, and fish, in its natural condition, without change of color or flavor, and to the application of inexpensive materials for that purpose.

Borax and boracic acid have been applied, either alone or in combination with other materials, to the preservation of meat, but with little success, owing partly to the inability of these antiseptics, as they have hitherto been applied, to preserve the meat under high temperatures, and partly to the high price of those materials when refined or chemically pure, as they have been hitherto used.

According to my invention I employ a mixture of these substances in their native crude and, consequently, cheapest form, with a little salt and saltpeter, whereby the natural color of the meat is retained. The proportions in which these substances are mixed may be somewhat varied; but about one hundred and fifty parts, by weight, of boracic acid with thirty parts of borax, fifteen parts of common salt, and five parts of saltpeter form a mixture well adapted for the purpose. This mixture I dissolve in about ten times its weight of hot water, and allow the solution to cool. I then throw the joints or parts of the animal to be preserved into the cold solution, and allow them to remain therein from twenty-four to thirty-six hours, after which they are taken out and closely packed for transport in barrels or cases. I prefer to bed the meat in melted fat of the same kind, so that it is covered thereby.

When the meat thus preserved is to be used it is rapidly washed with cold water and wiped before cooking. The very small quantity of the antiseptic ingredients remaining in the meat has no effect upon its flavor, nor do these ingredients affect the health of the consumer, as they are of a perfectly innocuous character, even when taken in considerable quantity.

Having thus described the nature of my invention, and in what manner the same is to be performed, I hereby declare that I make no general claim to the use of borax or boracic acid as antiseptics; but

I claim—

The herein-described antiseptic mixture for the preservation of uncooked meat, consisting of crude boracic acid and borax, with common salt and saltpeter, in solution, and in the proportions substantially as described.

In testimony whereof I have signed my name to this specification before two subscribing witnesses.

ALEXANDER HERZEN.

Witnesses:
 ALBERT CONTI,
 ALBERT CAHENT.